(No Model.)
C. DE QUILLFELDT.
FORK ATTACHMENT FOR PICKLE JARS.
No. 277,467. Patented May 15, 1883.
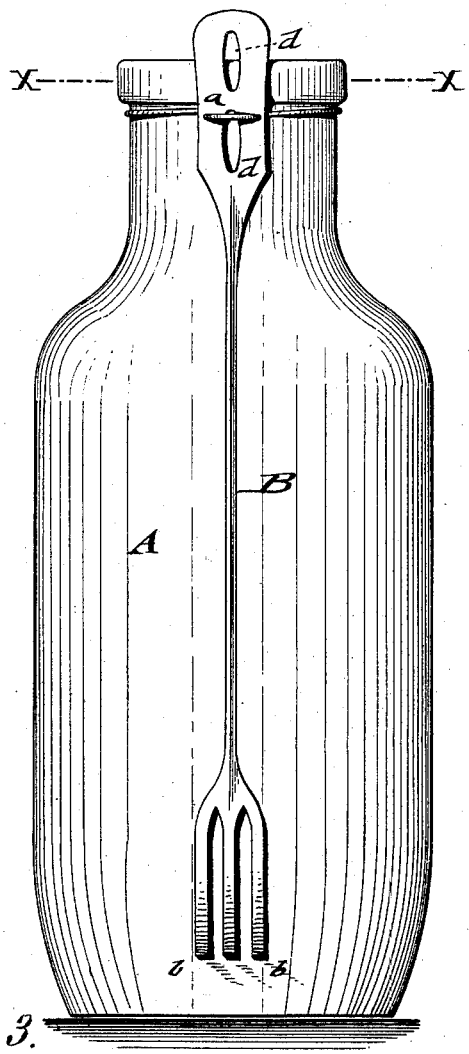
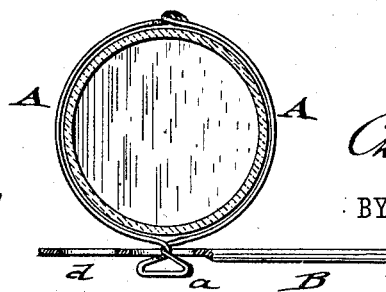
WITNESSES:
INVENTOR
Charles de Quillfeldt
BY Paul Goepel
ATTORNEY

UNITED STATES PATENT OFFICE.

CHARLES DE QUILLFELDT, OF NEW YORK, N. Y.

FORK ATTACHMENT FOR PICKLE-JARS.

SPECIFICATION forming part of Letters Patent No. 277,467, dated May 15, 1883.

Application filed October 16, 1882. (No model.)

*To all whom it may concern:*

Be it known that I, CHARLES DE QUILLFELDT, of the city, county, and State of New York, have invented certain new and useful Improvements in Fork Attachments for Pickle-Jars, of which the following is a specification.

The object of this invention is to furnish with pickle and other jars a fork that is attached thereto in such a manner that it cannot get detached when the jar is packed for shipment or when suspended therefrom, but that is readily removed for use; and the invention consists of a pickle-fork the handle of which is connected by slots or openings to a T-shaped horizontal button secured to the neck of the jar.

In the accompanying drawings, Figure 1 represents a side elevation of a jar with my improved fork attached thereto, ready to be packed for shipment. Fig. 2 is a front elevation of a jar with a fork attached ready for use at the table; and Fig. 3 is a horizontal section of the jar on line $x$ $x$, Fig. 2, showing the fork in the act of being detached from its fastening device.

Similar letters of reference indicate corresponding parts.

Referring to the drawings, A represents a jar for pickles or similar articles, which is provided at its neck and near the mouth of the jar with a small T-shaped button, $a$, formed of wire or other suitable metal, which button is secured in horizontal position in any suitable manner by a wire neck-band or other fastening devices.

To the button $a$ is applied a fork, B, which is bent either of wire or stamped out of sheet metal, the fork being bent to conform to the outline of the jar. It is made with angular tines $b$ and with the slots or openings $d$ in the handle portion, as shown clearly in Figs. 1 and 2.

When the jar and fork are packed ready for shipment the fork is applied to the button $a$ by being first placed in horizontal position, so that the upper opening or slot, $d$, may be readily passed over the button, when the fork is allowed to drop on the shank of the button $a$ into a vertically-pendent position, so as to hug closely the jar, while the tines project below the bottom of the jar, as shown in Fig. 1. The wrapper is then placed around the jar and fork, and the jar sold, together with the fork, to the customer. When used either at the table or at picnics, the fork is suspended preferably from the second slot, $d$, so that the tines do not interfere with the table-cloth, as shown in Fig. 2. In this position the fork may be readily taken hold of and removed from the jar by simply turning it on the shank of the button into horizontal position, as shown in Fig. 3, and removing it then from the jar. It is replaced in the same manner, and then always on hand for use.

By furnishing the jars in this manner with forks the contents of the jars can be conveniently removed at any time or place, while the fork is always retained when not required for use, without being detached and lost.

Having thus described my invention, I claim as new and desire to secure by Letters Patent—

1. The combination of a pickle or other jar having a button or other supporting device applied to the neck thereof, with a fork having slots or openings in the handle thereof, substantially as set forth.

2. The combination of a pickle or other jar having a horizontal T-shaped button applied to the neck thereof, with a pickle-fork having one or more longitudinal slots or openings in the handle of the same, substantially as set forth.

3. The combination of a pickle or other jar having a button or other fastening device applied to the neck thereof, with a fork bent to conform to the outline of the jar and provided with slots or openings in the handle portion thereof, substantially as specified.

In testimony that I claim the foregoing as my invention I have signed my name in presence of two subscribing witnesses.

CHARLES DE QUILLFELDT.

Witnesses:
PAUL GOEPEL,
SIDNEY MANN.